June 30, 1925.
R. P. PESCARA
PARACHUTE PROPELLER FOR HELICOPTERS
Filed July 15, 1920
1,544,174
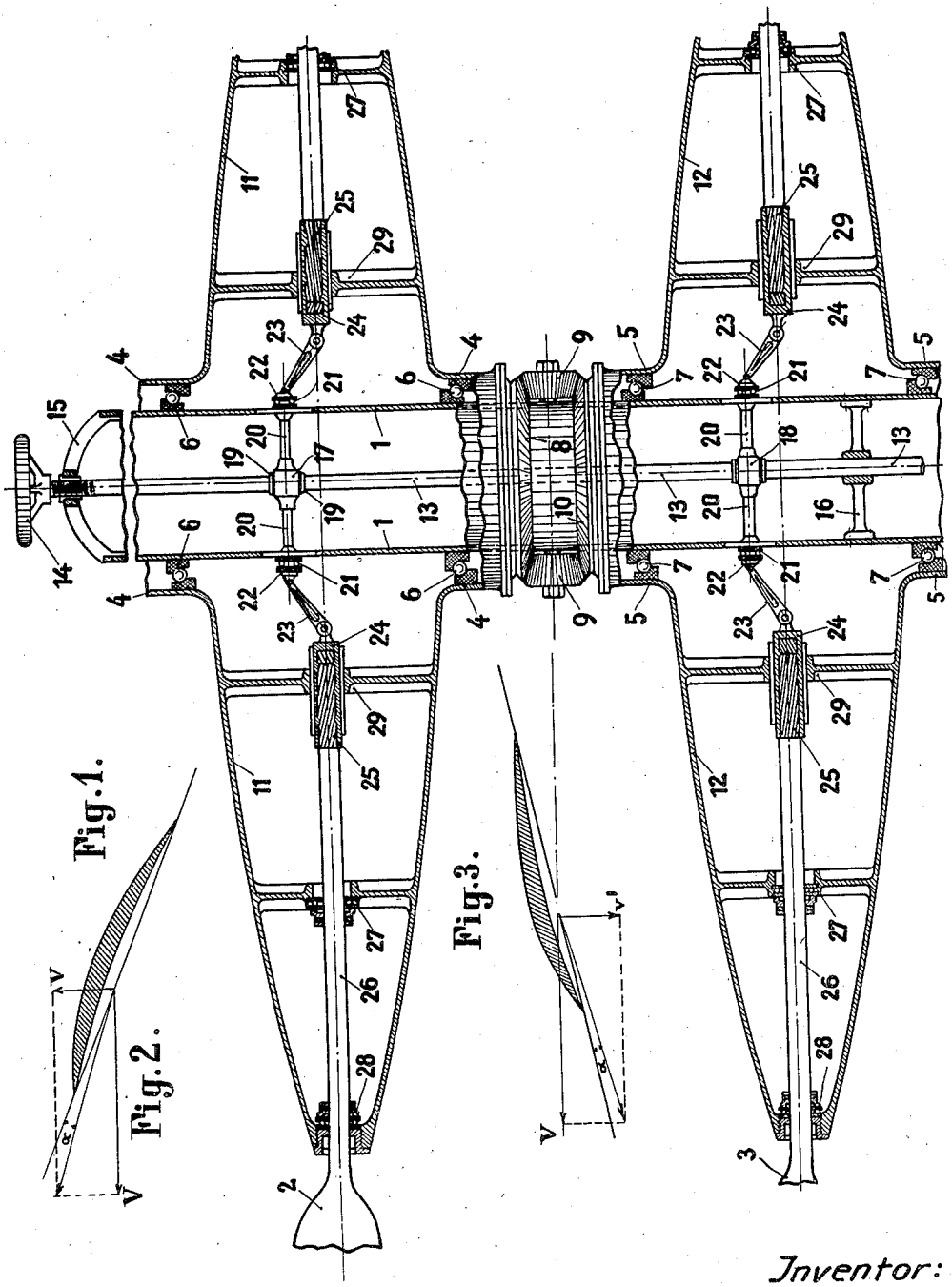
Inventor:
Raul Pateras Pescara,
By B. Singer, Atty.

Patented June 30, 1925.

1,544,174

UNITED STATES PATENT OFFICE.

RAUL PATERAS PESCARA, OF BARCELONA, SPAIN.

PARACHUTE PROPELLER FOR HELICOPTERS.

Application filed July 15, 1920. Serial No. 396,596.

*To all whom it may concern:*

Be it known that I, RAUL PATERAS PESCARA, a citizen of the Argentine Republic, residing at Calle de la Buena Suerte, No. 20, Barcelona, Spain, have invented a new and useful Improvement in Parachute Propellers for Helicopters, (for which I have filed an application June 28, 1919, in Spain), of which the following is a specification.

This invention relates to a helicopter propeller of a type adapted to be used for parachutes and which is so constructed that a regulated, and consequently safe and directed, descent may be secured.

In the drawings annexed hereto and forming a part of this specification:

Figure 1 is a central vertical section through a helicopter propeller system constructed according to the present invention.

Figs. 2 and 3 are diagrammatic views showing the action of the forces on the propeller blades.

In helicopterics a propeller is understood to mean any body or member adapted to provide a thrust or push, along an axis, by means of the rotation of surface constructed with or without helicoidal torsion.

Heretofore it has been thought in the case of accidental stoppage of the motor or motors of a flying machine of the helicopter type, that descent under the action of gravity would produce an acceleration which would finally result in grave danger to the machine and also to the passengers.

Considering a system of two propellers (which offers the most practical example in such apparatus) rotating in opposite directions and suppose that the resultant vertical thrust due to the action of the motors maintains the machine immovable in the air, At any given moment the motive power may be cut off and the following phenomena may occur.

(a) If the machine be not provided with a clutch the propellers stop and the machine falls perpendicularly.

(b) In a machine provided with a clutch, which could be actuated to free the propellers, the speed of rotation of the latter then tends to decrease, their thrust being reduced and the descent of the machine being cushioned or dampened.

The speed of rotation which diminishes and that of the fall which increases compound and give rise to an aerodynamic force opposing more and more the rotation of the propellers; consequently at the end of a definite time the propellers stop.

The air acts meanwhile on the blades of the propellers with a direction and intensity in accordance with the speed of the fall. Therefore, there arises a force which tends to impart to the propeller a speed of rotation in a direction opposite to the original direction, and the propellers therefore commence to turn in the opposite direction.

During this time, the speed of the fall has increased proportionally. In spite of this the blades give a slight thrust which increases gradually according as the speed of the fall accelerates, until the thrust exerted by the propellers balances gravitational action. The condition thus established is therefore characterized by a different speed but nearly as great as the speed of the fall.

Now, by the use of a suitable profile, the matter can be presented in another form. The speed of rotation would then likewise increase considerably until, when it compounded with that of the speed of the descent, a force would be produced capable of braking or cushioning the descent and thereby establishing a condition much less dangerous to the machine; such a condition will be hereinafter referred to as "reverse rotary vol plane".

This phrase will designate therefore the descending movement, without regard to the motive power, retarded by the thrust due to the reverse auto-rotary movement.

The auto-rotation of the blades is due to forces which arise in consequence of the composition of velocities of the descent and rotation. But in order that the speed of descent may be minimum (which is of practical interest), the blades of the propellers ought to have an angle of incidence characterized by the minimum relation between the resistance and the thrust or a near angular approximation thereto.

The inconveniences in the method of operation arising from the above are as follows:

It will be necessary to declutch the propellers from the motor before they turn in a direction opposite to the normal, which from that moment can not be restarted.

This condition is only established after a long and dangerous fall.

The air being attacked by the trailing edge of the blade, the condition thus established corresponds to a poor relation between the resistance and the thrust of the blades. This condition is therefore characterized by still too great a speed of descent.

Parachute propellers for helicopter machines, forming the subject of the present invention and to which the present description relates are intended to obviate these inconveniences by means hereinafter referred to "direct rotative vol plane."

Under this name I desire it to be understood that I mean the descent or fall without any expenditure on the part of the motor or driving power, retarded by the thrust due to the direct auto-rotation of the propellers.

In order to ensure that the blades receive the resultant velocity of the air at a favorable angle, already mentioned, it is necessary that, at the moment of stoppage of the motor when the descent begins, the blades should be moved so as to effect an instantaneous decrease in the value of this angle of attack in such manner that (the propellers turning always in the same direction) they make, with the resultant of the velocities of descent and rotation, an angle approximately equal to that characterized by the minimum value between the resistance and the thrust for the profile employed. This moment permits the establishment, almost immediately, of the condition of descent (when the thrust is equal to the weight of the machine) which has been designated "direct rotative vol plane."

The phenomenon is analogous to the vol plane of an aeroplane but presents thereover the following essential difference.

An aeroplane glides according to an inclined trajectory at an angle and with a velocity V which animates the entire machine. In a helicopter the blades of the propellers described, in gliding, a helicoidal trajectory at a different speed although of the same order as V and at an angle $a$ but the frame of the machine is only animated or subjected to the vertical component V sin $a$ which is very small compared to V.

Finally at the moment of landing of the machine, the pilot can increase the angle of attack of the blades and thus by utilizing the live force stored in the rotating blades, create a vertical thrust the effect of which will be to brake, and in case of need, reverse the speed of descent V.

With the above brief summary it may be concluded that parachute propellers for helicopter machines permit of obtaining 1. The direct rotative vol plane.
2. Braking of the speed of descent and of effecting a landing without shocks.

With reference to Fig. 1, it will be observed that the tube 1 forms the axis of rotation of the propellers 2 and 3, and the hubs 4, 5 of the said propellers rotate about the tube 1, in opposite directions on ball bearings 6, 7.

The bevel gears 8, 9, 10 connect the hubs of the propellers. The pinions 9 have their axes of rotation rigidly fixed to the tube 1 and the crown wheels 8 and 10 are rigid with the hubs 4, 5, respectively.

Rotating casings 11 and 12 serve to support the blades of the propellers and the driving members hereinafter described.

In the interior of the central tube 1 is a rod 13 which is adapted to rise or fall on its axis. This movement is transmitted to a rod B by means of its screw connection with the fixed support 15, a wheel 14 being attached to the rod to turn the same. The other guide, indicated at 16, serves only to maintain proper direction of rod 13.

The rod 13 is connected at 17 and 18 to mechanisms acting on the blades, and as both these mechanisms are identical only one of them will be described.

The part 17 is formed by a ring into which the rod 13 fits with slight friction and it can be actuated during the rising and falling movement of the rod 13 by the shoulders 19.

The arms 20 traversing the tube 1 through the openings, as shown, allows them rise and fall, said arms being connected rigidly to the ring 17 and to the cylindrical part 21.

The rings 21 and 22 form a ball race of which the inner ring is fixed to the arms 20 and the outer is moved by the movement of the blades.

In front of each blade the ring 22 is provided with a pivot on which is mounted a rod 23, pivoted in a part 24 provided with an internal screw thread of coarse pitch. Exteriorly the sleeve 24 is provided with rectilineal slots parallel to the axis which prevents it turning on itself. The rod 25 which is provided with a screw thread corresponding to that of the sleeve 24, forms the end of the longeron 26, to which the blade is rigidly connected.

Support and thrust bearings 27, 28 and 29 serve to guide the blade longeron in its rotary movements and receive, at the same time, the stresses to which it is subjected.

Finally it may be observed for a clear understanding of the invention that the movement is composed of two parts separated by the ball race 21, 22; one fixed and comprising the parts marked 13 to 21 and the other participating in the rotational movement of the blades and bearing the reference numerals 22 and 26.

I will now explain how the said mechanism permits the movements necessary to obtain a "rotative vol plane" and which results in a reduction, as previously described, in the angle of attack of the blades.

At the moment when the descent begins, the pilot manœuvres the wheel 14 to cause the rod 13 to rise and with it the ball bearing 21, 22. The rod 23 then causes the part 24 to slide towards the center of the apparatus and as the latter cannot turn on itself, the rod 25 rotates in consequence of its connection with the sleeve 24 by the screw thread of coarse pitch. As this rod is rigid with the longeron 25, to which the blade is rigidly connected, it is obvious that the angle of attack of the blade under consideration will be considerably decreased; thus the same movement takes place instantly with all the blades.

Fig. 2 shows the position of the blade during the ascending period of the apparatus. V represents the velocity of rotation $v$ that of the rise and $a$ the angle of attack.

Fig. 3 shows the position of the blade during the rotative vol plane. V is the speed of rotation $v'$ the descent, and $a$ the angle of favorable attack.

While, in the foregoing, I have described a specific embodiment of the invention it is to be understood that in carrying the same into practice I may resort to any and all modifications falling within the scope of the appended claims.

I claim:

1. In a helicopter parachute, propellers, and mechanism connected therewith for shifting the propellers without power expenditure, from a plus to a minus pitch, to maintain a rotation in the same direction, and at the moment of landing to effect a change from the negative angle to a flat position or a positive value for braking, by increasing the angle of incidence or shifting the same from a negative to a positive angle.

2. In a helicopter parachute, propellers, means inducing reverse rotation of the propellers, and mechanism connected with said propellers for shifting the propellers without power expenditure, from a plus to a minus pitch, to maintain a rotation in the same direction, and at the moment of landing to effect a change from the negative angle to a flat position or a positive value for braking, by increasing the angle of incidence or shifting the same from a negative to a positive angle.

3. In a helicopter parachute, propellers, means inducing reverse rotation of the propellers, mechanism connected with said propellers for shifting the propellers without power expenditure, from a plus to a minus pitch, to maintain a rotation in the same direction, and at the moment of landing to effect a change from the negative angle to a flat position or a positive value for braking, by increasing the angle of incidence or shifting the same from a negative to a positive angle.

4. In a helicopter parachute, propellers, means for inducing reverse rotation of the propellers, articulated mechanism connected with said propellers for shifting the propellers without power expenditure, from a plus to a minus pitch, to maintain a rotation in the same direction, and at the moment of landing to effect a change from the negative angle to a flat position or a positive value for braking, by increasing the angle of incidence or shifting the same from a negative to a positive angle.

5. In a helicopter parachute, propellers, means for inducing reverse rotation of the propellers, screw operated articulated mechanism connected with said propellers for shifting the propellers without power expenditure, from a plus to a minus pitch, to maintain a rotation in the same direction, and at the moment of landing to effect a change from the negative angle to a flat position or a positive value for braking, by increasing the angle of incidence or shifting the same from a negative to a positive angle.

6. In a helicopter parachute, propellers, means gearing the propellers together for simultaneous rotation, and screw operated articulated mechanism connected with said propellers for shifting the propellers without power expenditure, from a plus to a minus pitch, to maintain a rotation in the same direction, and at the moment of landing to effect a change from the negative angle to a flat position or positive value for braking, by increasing the angle of incidence or shifting the same from a negative to a positive angle.

7. In a helicopter parachute, propellers, means gearing the propellers together for rotation in opposite directions, and screw operated articulated mechanism connected with said propellers for shifting the propellers without power expenditure, from a plus to a minus pitch, to maintain a rotation in the same direction, and at the moment of landing to effect a change from the negative angle to a flat position or a positive value for braking, by increasing the angle of incidence or shifting the same from a negative to a positive angle.

8. In a helicopter parachute, propellers, a hub mounting each propeller and carrying a bevel gear, pinions intermediate the hubs and meshing with the bevel gears, a hollow spindle mounting said hub and pinion, articulated mechanism connected with said propellers for shifting the propellers without power expenditure, from a plus to a minus pitch, to maintain a rotation in the same direction, and at the moment of landing to effect a change from the negative angle to a flat position or a positive value for braking, by increasing the angle of incidence or shifting the same from a negative to a positive angle, and screw operated means within the spindle for actuating the articulated mechanism.

9. In a helicopter parachute, propellers, a hub mounting each propeller and carrying a bevel gear, pinions intermediate the hubs and meshing with the bevel gears, a hollow spindle mounting said hubs and pinion, articulated mechanism connected with said propellers for shifting the propellers without power expenditure, from a plus to a minus pitch, to maintain a rotation in the same direction, and at the moment of landing to effect a change from the negative angle to a flat position or a positive value for braking, by increasing the angle of incidence or shifting the same from a negative to a positive angle, and screw operated means within the spindle for actuating the articulated mechanism and for exerting a braking action at the moment of effecting a landing.

In testimony whereof I affix my signature in presence of two witnesses.

RAUL PATERAS PESCARA.

Witnesses:
 EUSEBIC GARCIA,
 YORE CALAF.